(12) United States Patent
Lioy et al.

(10) Patent No.: US 8,180,899 B2
(45) Date of Patent: May 15, 2012

(54) APPARATUS AND METHOD FOR SUPPORTING BROADCAST/MULTICAST IP PACKETS THROUGH A SIMPLIFIED SOCKETS INTERFACE

(75) Inventors: Marcello Lioy, San Diego, CA (US); Uppinder Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 585 days.

(21) Appl. No.: 11/835,001

(22) Filed: Aug. 7, 2007

(65) Prior Publication Data

US 2008/0040487 A1    Feb. 14, 2008

Related U.S. Application Data

(60) Provisional application No. 60/836,780, filed on Aug. 9, 2006.

(51) Int. Cl.
  *G06F 15/16*    (2006.01)
  *G06F 15/173*   (2006.01)
(52) U.S. Cl. .................. 709/227; 709/228; 709/222
(58) Field of Classification Search ........... 709/204–207
  See application file for complete search history.

(56) References Cited

U.S. PATENT DOCUMENTS

| | | | | |
|---|---|---|---|---|
| 5,941,950 A * | 8/1999 | Hwang et al. | ................. | 709/227 |
| 6,181,697 B1 * | 1/2001 | Nurenberg et al. | ........... | 370/390 |
| 7,174,393 B2 * | 2/2007 | Boucher et al. | ............... | 709/250 |
| 7,835,743 B2 * | 11/2010 | Zhang et al. | ................. | 455/436 |
| 2002/0124089 A1 * | 9/2002 | Aiken et al. | ................. | 709/227 |
| 2004/0249957 A1 | 12/2004 | Ekis et al. | | |

FOREIGN PATENT DOCUMENTS

| | | |
|---|---|---|
| JP | 11068839 A | 3/1999 |
| JP | 2004528764 T | 9/2004 |
| JP | 2006050515 A | 2/2006 |
| TW | I235569 | 7/2005 |
| TW | I243569 | 11/2005 |

OTHER PUBLICATIONS

Dong-Jae Kang et al: "TCP/IP Offload Engine Module Supporting Binary Compatibility for Standard Socket Interfaces" Grid and Cooperative Computing—GCC 2005 Lecture Notes in Computer Science;;LNCS, Springer, Berlin, DE, vol. 3795, Jan. 1, 2005, pp. 357-369, XP019024938 ISBN: 978-3-540-30510-1.
International Search Report and Written Opinion—PCT/US2007/075405, International Search Authority—European Patent Office—Nov. 12, 2008.

* cited by examiner

*Primary Examiner* — Ian M Moore
*Assistant Examiner* — Thai Nguyen
(74) *Attorney, Agent, or Firm* — James T. Hagler (57) ABSTRACT

A method for configuring an IP address to receive broadcast or multicast data flow which modifies the bind( ) Application Programming Interface (API) to survey available local interfaces to determine their ability to be configured to receive data from a particular IP address, configure a interface to receive the IP address if it is so configurable, bind the IP address to that interface. The modified bind*( ) API may interact with one or more interfaces to see if each interface is capable of being configured to the IP address. Alternatively, the modified bind*( ) API determines the configurability of interfaces by consulting the access control list. Policy based routing rules may be implemented so that the modified bind*( ) operation configures the highest priority interface based upon policy parameters.

12 Claims, 11 Drawing Sheets

APPARATUS AND METHOD FOR SUPPORTING BROADCAST/MULTICAST IP PACKETS THROUGH A SIMPLIFIED SOCKETS INTERFACE

RELATED APPLICATIONS

The present application claims the benefit of U.S. Provisional Patent Application No. 60/836,780, filed on Aug. 9, 2006, the entirety of which is hereby incorporated herein by this reference.

FIELD OF THE INVENTION

The present invention relates to application programming interface tools and methods for establishing IP connections to a client processor.

BACKGROUND

Internet technology enables the delivery of high quality audio and video content to locations and devices previously beyond the reach of television, radio and other forms of audio and video distribution. This has lead to the development of many new applications and devices for distributing broadcast audio and video streams via the Internet. For example, it is now possible to receive video, such as television clips, on cellular telephones. Such technology has the potential to revolutionize the visual medium, television and the film industry. Thus, there is a growing need for applications that deliver broadcast streams to a wide range of devices via the Internet.

Applications that will receive a broadcast or multicast video stream via the Internet must establish a connection to the Internet that is tied to a source of the video stream. The standard interface for connecting to the Internet in modern operating systems is known as the Berkeley Sockets Application Programming Interface (API), also referred to as the BSD socket API. (BSD stands for Berkeley Software Distribution, which is sometimes referred to as Berkeley Unix). An API is a source code interface that a computer system or program library provides to support requests for standard services to be made of it by computer programs (applications). The Berkeley sockets API comprises a library of routines useful for developing computer networking applications in the C programming language. While the Berkeley socket API is not the only such API in use, most programming languages suitable for developing Internet applications use an interface that is similar in terms of the included routines and their functionality. Additionally, many programming languages have adopted a version of BSD socket APIs. Therefore, descriptions of APIs herein are based upon the format and functionality of BSD socket APIs.

In order for an application to receive a broadcast or multicast video stream via the Internet, a connection, referred to as a "socket," to the source must be created. A socket is an end-point of an Internet connection between a client and a server. Creating a socket ensures that packets sent by the server will be delivered to the client application. To create a socket, an application calls the socket( ) API. When a socket is created in this manner, it is given an address family but not assigned to a particular local interface in the client device. Therefore, before a socket may accept incoming data from the server, it must be assigned to a particular local interface which will serve as the device interface with the Internet. One method of assigning a particular local address to a socket is accomplished by the bind( ) API.

For an application to listen to a broadcast or multicast stream, the application must either invoke an ioctl( ) or a socket_opt( ) call. When invoking either an ioctl( ) or a socket_opt( ) call, the specific interface on which the IP broadcast stream is to be received must be known. However, typical devices have a number of interfaces over which data may be received. Previously, in order to determine the particular local interface through which the IP data stream will be received, the application must perform a complex set of instructions. This added complexity leads to unnecessary program overhead, application development costs, and processing delay in establishing connections to a broadcast stream.

SUMMARY

The various embodiments provide a streamlined method for configuring an IP address to receive broadcast data flow. The bind( ) API is modified and extended to survey available local interfaces, determine if an interface is capable of being configured to receive data from a particular IP address, configure the interface if it is capable of being so configured and then bind the IP address to that interface. In an embodiment, the bind( ) API explicitly interacts with one or more interfaces to see if each interface is capable of being configured to the IP address. In another embodiment, the bind( ) API determines the configurability of interfaces by consulting a routing look up table. In a variation of this embodiment, policy based routing rules may be implemented so that the bind( ) operation configures the highest priority interface based upon policy parameters.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

The various embodiments will be described in detail with reference to the accompanying drawings. Wherever possible, the same reference numbers will be used throughout the drawings to refer to the same or like parts. References herein to the bind( ) API are intended to refer to any and all implementations of the functionality described herein and illustrated in the figures, and is not intended to limit the scope of the invention or the claims to any one particular function call, API implementation, software programming language, or application.

Presently, a wide variety of electronic devices are capable of receiving Internet data over wired and wireless networks, and therefore capable of implementing broadcast and multicast applications. Such devices include personal computers, laptop computers and workstations. More recently, mobile devices such as cellular telephones, personal digital assistants (PDAs) with wireless modems, wireless electronic mail receivers (e.g., the Blackberry® and Treo® devices), and multimedia Internet enabled cellular telephones (e.g., the iPhone®) have become portals to the Internet. It is anticipated that the development of broadcast and multicast video IP applications for mobile devices may one day eclipse that of traditional personal computing machines.

In general, mobile devices (e.g., PDAs, cell phones) have limited computing power and memory compared to personal and laptop computers, if for no other reason than to minimize power consumption so as to extend battery life. Consequently, applications executed upon mobile devices need to be efficient and eliminate unnecessary processing overhead wherever possible. To this end, the various embodiments of the present invention provide a simplified method for establishing a socket connection for receiving broadcast IP packets.

The various embodiments modify the bind( ) API or propose a new bind_broadcast( ) API. Therefore, before describing the embodiments it is useful to review the functioning of a typical bind( ) API implementation.

The bind( ) API assigns a socket to a local interface so that data flowing from the source server via the socket can be received by the application. The bind( ) API call requires three arguments. First, the call must include a descriptor representing the socket, which is a value received after performing the socket( ) API used as a handle for the socket for purposes of reading and writing data. Second, the call must specify the data structure that defines both the Local IP address and the local port number to be used to complete the bind to the IP address that has been configured on the system. Alternatively, a wildcard value (which is "0" or INADDR_ANY in a number of API implementations) may be provided as the second argument. In this case the API will bind any interface configured with an IP address. However, in order to simplify the description of the various embodiments, this function argument will be referred to herein as the indicated IP address or simply the IP address. Third, the call must specify the length of the local address, which allows the function to accommodate different versions of IP.

If the IP address is included in the bind( ) API call (i.e., not the INADDR_ANY option), the function evaluates each local interface on the device or system to see whether the interface is configured to connect with that IP address. If it finds a local interface configured for the IP address, the bind( ) function assigns the specified local port number as the source port on outgoing datagrams and the destination port for incoming datagrams received via the socket. The function also returns a flag value of "0" to indicate the binding operation was successfully completed. In some implementations, such as Unix, this success flag value is "0", so for illustration purposes, the figures and the discussion use "0" as the success flag value. However, the present invention and the claims should not be construed as being limited to using a success flag value of "0." If no local interface is configured for the IP address specified in the bind( ) API call, an error code is generated and a failed flag value is returned to indicate that the operation failed. In some implementations, such as Unix, this failed flag value is "–1", so for illustration purposes, the figures and the discussion use "–1" as the failed flag value. However, the present invention and the claims should not be construed as being limited to using a failed flag value of "–1". Thus, if no local interface has not already been configured for the IP address, the bind( ) function call will fail. The error code generated may be stored to a register, for example a register labeled "errno," for access by the application. Since error codes may vary among different API implementations and are well documented, the details of such error codes are not essential to the present invention.

If the INADDR_ANY wildcard or "0" is specified as the local address in the bind( ) API call, then the function will bind to any and all local interfaces that are configured to access the indicated socket, and if no interface is so configured, an error code is generated and a flag value (–1) is returned to indicate that the operation failed.

Figure 1A:
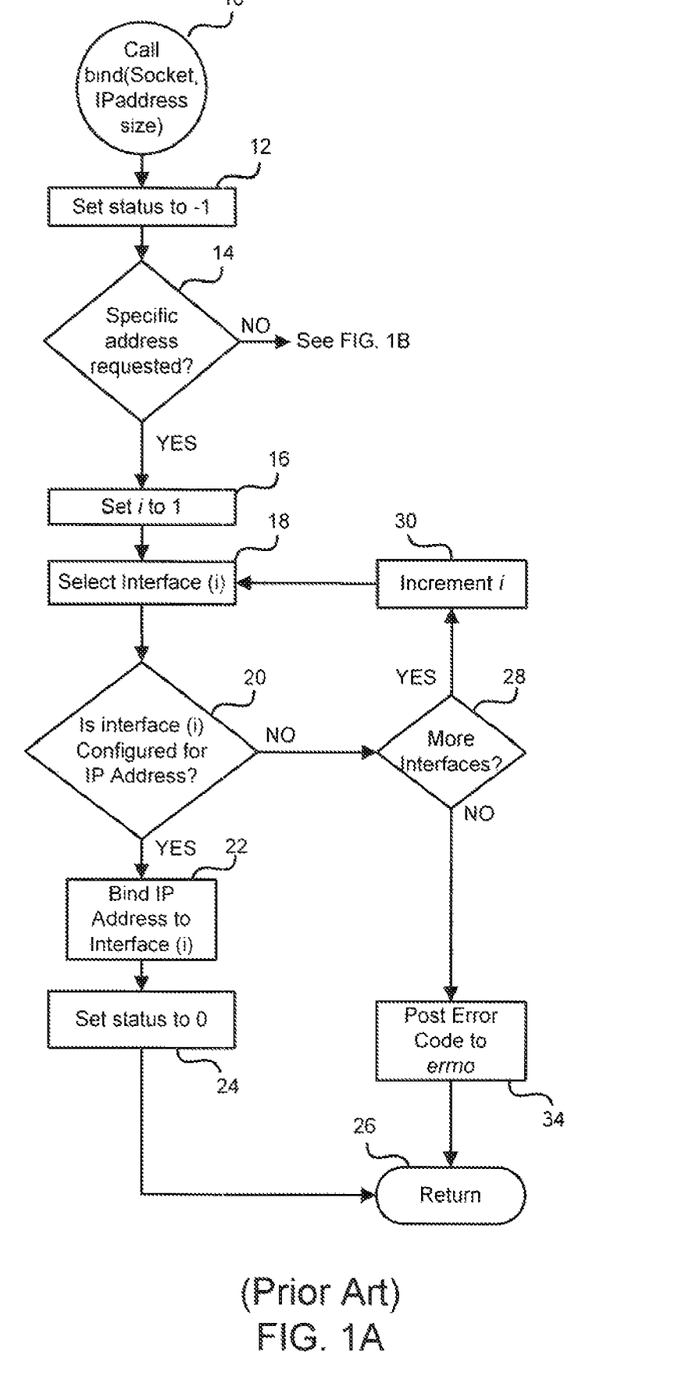
FIGS. 1A and 1B are a flow diagrams illustrating the functionality of the present bind( ) API.

The basic functional steps of the bind( ) API when an IP address is indicated (i.e., excluding the INADDR_ANY functionality) are illustrated in FIG. 1A. This flow diagram is meant to illustrate the top level functionality of the function, and does not necessarily reflect the actual software processes implemented by the API. Within the bind( ) call 10 are the descriptor of the indicated socket, the IP address that is to be bound to the socket, and the length of the IP address. Since the bind( ) function returns a "0" for successful binding and "–1" if binding is unsuccessful, this flag value may be set at –1 upon initiation of the function, step 12, or may be set to "–1" at a later time based upon a test. The bind( ) function also tests the call arguments to determine if an IP address has been indicated or whether a wildcard value (e.g., "0") is specified, step 14. If a specific IP address is requested in the function call, (i.e., the result of test 14 is "YES"), the bind( ) function may test the configuration of the interfaces one at a time such as by performing a loop routine, an example of which is illustrated in steps 16, 18, 20, 28, 30. A counter may be initialized to indicate or point to the first interface, step 16. Then using the count value, the function selects an interface, step 18, and the selected interface is queried to determine if it has been configured for the indicated IP address, step 20. If it is so configured, the function binds the indicated socket or IP address to the specified local interface, step 22, and sets the status flag to "0" indicating that the bind( ) operation was successful, step 24, and returns to the application that made the bind( ) call, step 26. If the selected interface has not been configured for the indicated IP address (i.e., the result of test 20 is "NO"), the function may test the counter (e.g., by comparing the counter to the total number of device interfaces) to determine if there are more interfaces to be evaluated, step 28, and if so, increment the counter to point to the next interface, step 30, before looping back to step 18 to continue the process. If the last interface has been evaluated (i.e., the result of test 28 is "NO"), an error code value is stored in a register (e.g., errno), step 34, and the function returns to the application that made the bind( ) call, step 26. The function returns a "–1" value in this situation indicating that the bind( ) operation failed.

Figure 1B:
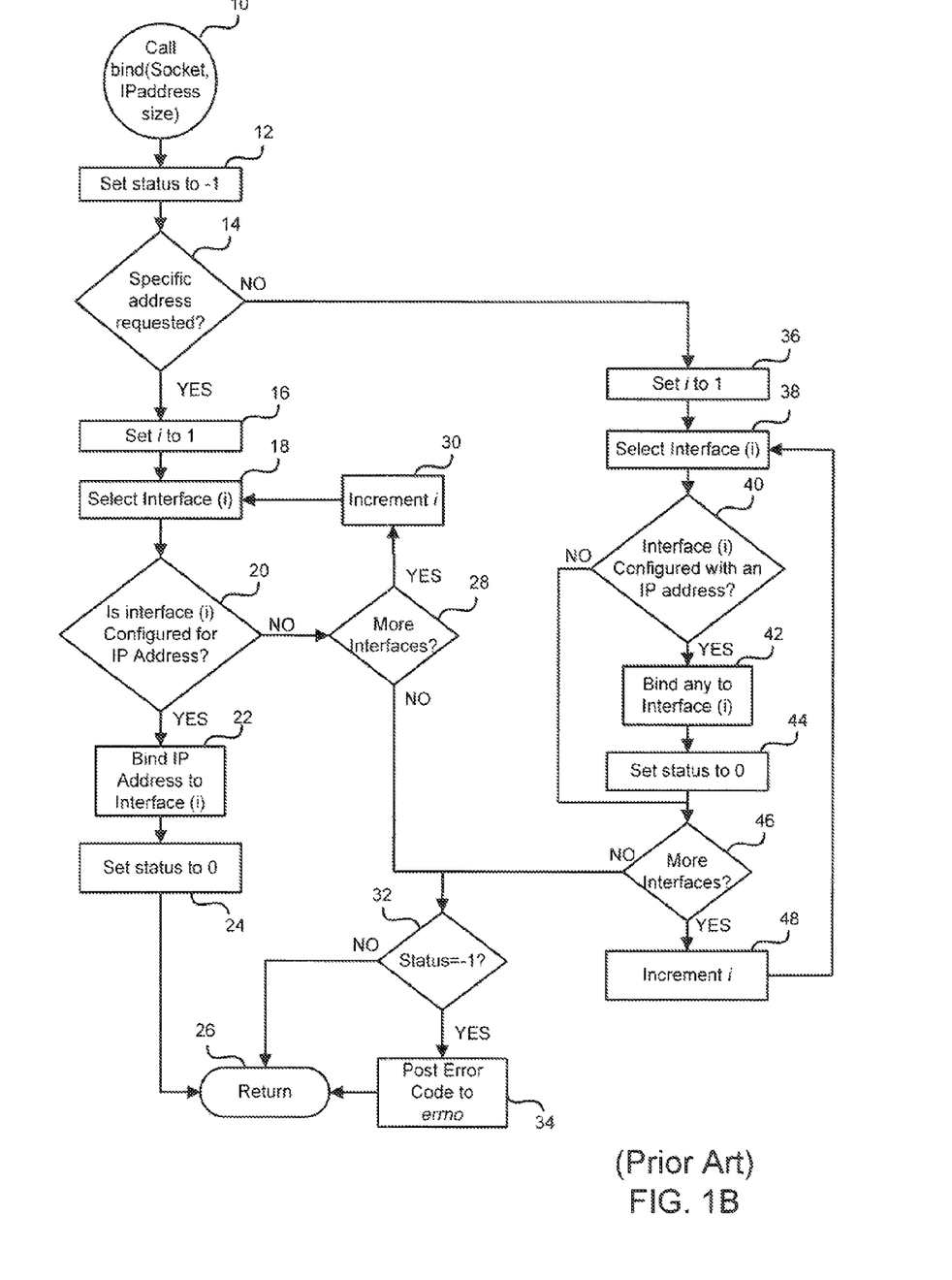

If the specified local interface value is a wildcard, such as INADDR_ANY or "0", (i.e., the result of test 14 is "NO"), the function will survey all of the interfaces in the device to determine if any interfaces can be configured to support any IP address by performing the INADDR_ANY functionality illustrated in FIG. 1B. The function may test all of the interfaces one at a time such as by performing a loop routine, an example of which is illustrated in steps 38, 40, 42, 44, 46, 48. A counter may be initialized to indicate or point to the first interface, step 36. Then using the count value, the function selects an interface, step 38, and the selected interface is queried to determine if it has been configured for the any IP address, test 40. If it has, the selected interface is bound to the socket, step 42, and a status flag is set to "0" to indicate successful binding, step 44. But rather than returning at this point, the function continues evaluating each interface by continuing to execute the loop by testing if more interfaces are to be evaluated, test 46, and if not, incrementing the counter, step 48, before looping back to step 38. Once all interfaces have been evaluated (i.e., the result of test 46 is "NO"), the function determines if an error code should be generated, such as by testing whether the status flag is equal to "0" or "−1", test 32. It will be appreciated that the test of the status flag may be in of a number of formats, and the test for "−1" versus "0" shown in the figures is just for illustrative purposes. If the status flag=−1, then no interface was bound, and therefore an error code needs to be generated and posted, step 34, before the function returns to the process that called the bind( ) API, step 26. However, if an address was bound (i.e., the result of test 32 is "NO"), an error code is posted, 34, before the function returns to the process that called the bind( ) API, step 26. (Note that test 32 is not illustrated in FIG. 1A because in that process the answer will always be "YES", so for simplicity of illustration, FIG. 1A shows the flow from test 28 to step 34 as being direct.)

As the functionality illustrated in FIGS. 1A and 1B reveals, the conventional bind( ) API only evaluates whether the selected interface has already been configured for the requested IP address. This limitation of the bind( ) API is presently overcome by additional application software steps which ensure that a particular interface is configured for the IP address of a broadcast or multicast data stream before the bind( ) API call is made. However, such software instructions add overhead and unnecessary complexity to the software application.

Figure 2:
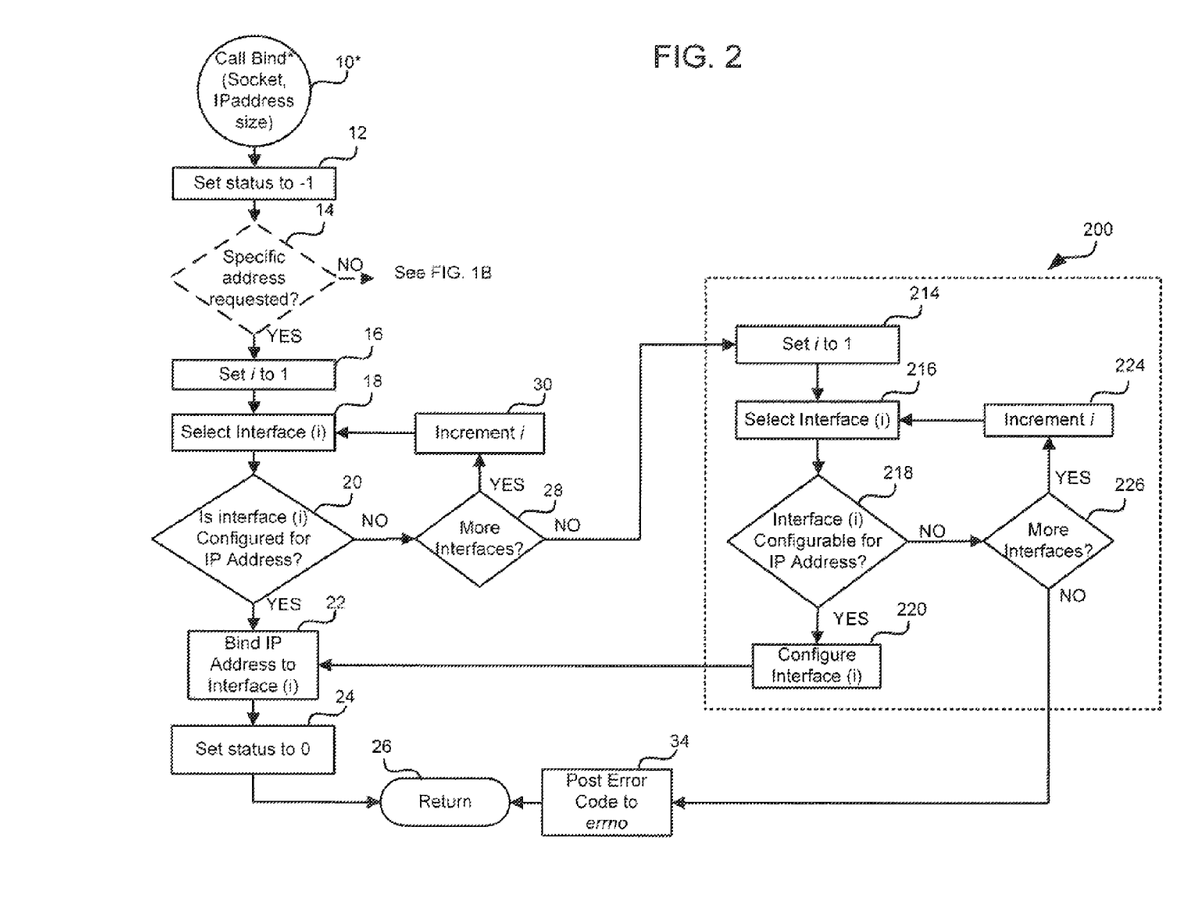
FIG. 2 is a process flow diagram illustrating a first embodiment modification to the bind( ) API.

FIG. 2 illustrates an embodiment intended to overcome the limitations of the conventional bind( ) API and simplify the establishment of a socket interface. In this embodiment, a modification is made to the process by which the operation surveys the system interfaces, adding new functionality 200 which determines whether an interface can be configured for the indicated IP address. For the sake of simplifying the description of this embodiment, FIG. 2 only depicts and the corresponding description only addresses the bind( ) API functionality for the case in which a specific IP address is requested to be bound is included in the bind( ) call 10*.

The functionality of the embodiment illustrated in FIG. 2 may be provided as a new API function, such as a bind_broadcast( ) (i.e., a supplement to the API library rather than a modification of the bind( ) API). Adding a new bind_broadcast( ) API for use with broadcast, multicast and other related video and/or audio applications may be preferred since those applications will not require the INADDR_ANY wildcard functionality illustrated in FIG. 1B. To reflect that the embodiment may be implemented as a new API, the call is labeled 10* and identified as Bind*( ) in FIGS. 2-5. Additionally, the test 14 of the IP address would not be needed in a new API dedicated to broadcast, so this step is shown with dashed lines in FIGS. 2-5 to indicate that it is optional and is not included in the description of those figures. In alternative embodiments, the bind( ) API may be modified to add the functionality described herein while retaining the legacy INADDR_ANY wildcard functionality of bind( ). Such alternative embodiments are illustrated in FIGS. 6-9 and described below.

Referring to FIG. 2, the function of the modified bind*( ) function proceeds in a manner similar to that described above with reference to FIG. 1A until all local interfaces have been evaluated. Specifically, the flag value may be set to −1 upon initiation of the function, step 12 (or may be set to "−1" at a later time based upon a test). Depending upon the particular API implementation, the bind( ) function may test all of the interfaces one at a time such as by performing a loop routine, an example of which is illustrated in steps 16, 18, 20, 28, 30. A counter may be initialized to indicate or point to the first interface, step 16. Then using the count value, the function selects an interface, step 18, and queries the selected interface to determine if it has been configured for the indicated IP address, step 20. If it is so configured, the bind*( ) function binds the indicated socket or IP address to the specified local interface, step 22, and sets the status flag to "0" indicating that the bind*( ) operation was successful, step 24, and returns to the application that made the bind( ) call, step 26. If the selected interface has not been configured for the indicated IP address (i.e., the result of test 20 is "NO"), the function may test the counter (e.g., by comparing the counter to the total number of device interfaces) to determine if there are more interfaces to be evaluated, step 28, and if so, increment the counter to point to the next interface, step 30, before looping back to step 18 to continue the process.

If the last interface has been evaluated (i.e., the result of test 28 is "NO"), this means that no interface was configured for the indicated IP address. Rather than returning and indicating a binding failure, the new functionality 200 is implemented. This new functionality 200 evaluates each interface a second time, such as by implementing a second loop (such as steps 214, 216, 218, 224, 226), to determine if an interface is capable of being configured to the desired IP address. For example, a counter may be initialized to indicate or point to the first local interface, step 214, followed by selection of that interface for evaluation, step 216. The function then evaluates the selected interface to determine if it can be configured for the indicated IP address 218, and if so, the interface is then configured for the IP address, step 220. Once the interface has been configured, the socket is bound to the interface, step 22, similar to the normal functionality of the conventional bind( ) API. Having successfully completed the binding operation, the status flag may be changed to "0", step 24, and the function completed by returning to the application that made the bind*( ) call, step 26.

There are at least two ways that the modified bind*( ) function can test the configurability of an interface for a particular IP address. In a first way, the bind*( ) function can explicitly interacts with the selected interface to determine if the selected interface is capable of being configured for the indicated address. This may involve performing a configure operation API or similar function call on the selected interface using the indicated IP address and testing whether a success value is returned. Not only does this confirm whether configuration is possible (this information conveyed by the returned value), it also accomplishes the configuration in the same step. Thus, steps 218 and 220 shown in the figures may be combined or accomplished in a single process call. If a process call is used that merely reports back that configuration to the indicated IP address is possible, then a separate operation, step 220, will be included in the bind*( ) function to accomplish the configuration.

In a second way, the new bind*( ) function can use a routing look up method, such as by accessing the system Access Control List (ACL), or another database that includes information on the interface configuration parameters, to determine the configuration parameters of the selected interface. If the device or system has implemented policy based routing, the ACL may list the address for which each interface has been configured, as well as the input/output configuration capabilities of each interface. Thus, by doing an ACL look up (such as by executing a loop that considers each interface value listed in the ACL), the function can quickly determine whether any of the interfaces have been configured or may be configured for the indicated IP address or socket.

If, after all the device or system interfaces have been evaluated (i.e., the result of test 224 is "NO"), no interface has been bound to the indicated IP address, this indicates that no interface is capable of being configured for the indicated IP address. Therefore, the modified bind*( ) function has failed, so the function posts an error code to an error register, step 34, and returns to the application that called the bind*( ) API, step 26. In the example process illustrated in FIG. 2, the status flag was not changed to "0" since no bind operation was accomplished, so a "−1" value is returned indicating that the bind*( ) operation failed. Those skilled in the programming arts will appreciate that the bind*( ) return value can be set in any number of ways and points during the process flow.

Figure 3:
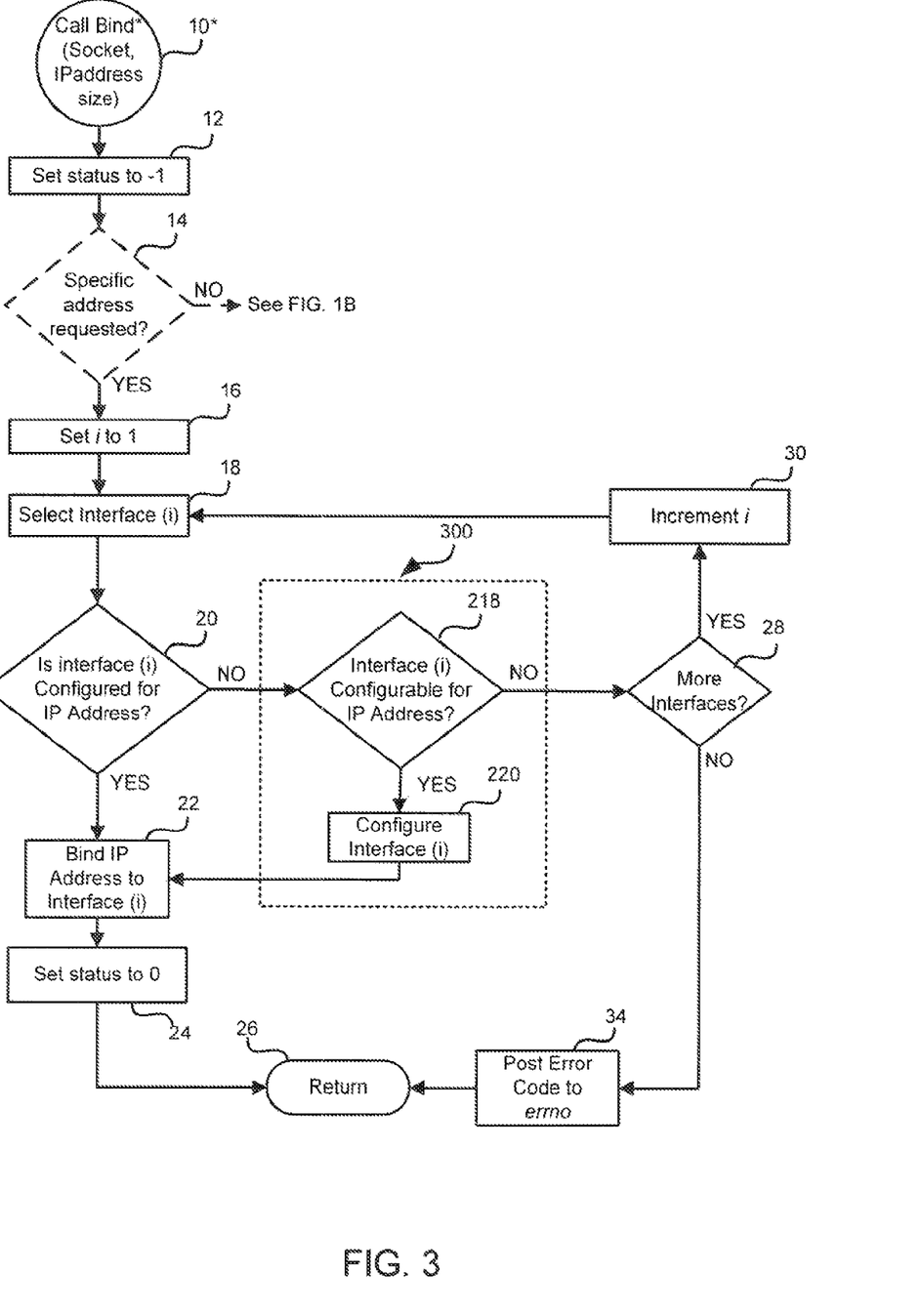
FIG. 3 is a process flow diagram illustrating a second embodiment modification to the bind( ) API.

FIG. 3 illustrates an alternative embodiment for implementing the present invention which requires only a single loop through the local interfaces of the system or device. Like the embodiment described above with reference to FIG. 2, the function begins in a manner similar to that of the conventional bind( ) function until it is determined that a selected interface is not configured for the indicated IP address (test 20). Specifically, the flag value may be set to −1 upon initiation of the function, step 12 (or may be set to "−1" at a later time based upon a test). Depending upon the particular API implementation, the bind( ) function may test all of the interfaces one at a time such as by performing a loop routine, an example of which is illustrated in steps 16, 18, 20, 28, 30. A counter may be initialized to indicate or point to the first interface, step 16. Then using the count value, the bind*( ) function selects an interface, step 18, and queries the selected interface to determine if it has been configured for the indicated IP address, step 20. If it is so configured, the function binds the indicated socket or IP address to the specified local interface, 22, and sets the status flag to "0" indicating that the bind*( ) operation was successful, 24, and returns to the application that made the bind*( ) call, step 26.

However, if the selected interface has not been configured for the indicated IP address (i.e., the result of test 20 is "NO"), the function than evaluates the interface to determine if it could be configured for the indicated IP address, step 218. As discussed above, there are least two ways in which this evaluation could be conducted. If it is determined that the interface can be configured to the indicated IP address, then it is so configured, step 220, after which the selected interface is bound to the socket, step 22. Having successfully bound an interface to the IP address, the status flag may be set to "0", step 24, after which the function returns to the application that called the bind*( ) API. If the selected interface is not capable of being configured to the indicated IP address (i.e., the result of test 230 is "NO"), the function may test the count to determine if there are more interfaces to be evaluated, step 28, and if so, increment the counter, step 30, before looping back to step 18. If there are no more interfaces to be evaluated (i.e., the result of test 28 is "NO"), this means that no interface has been bound so an error code will be posted to an error register, step 34, before the function returns to the application that called the bind*( ) API, step 26.

Figure 4:
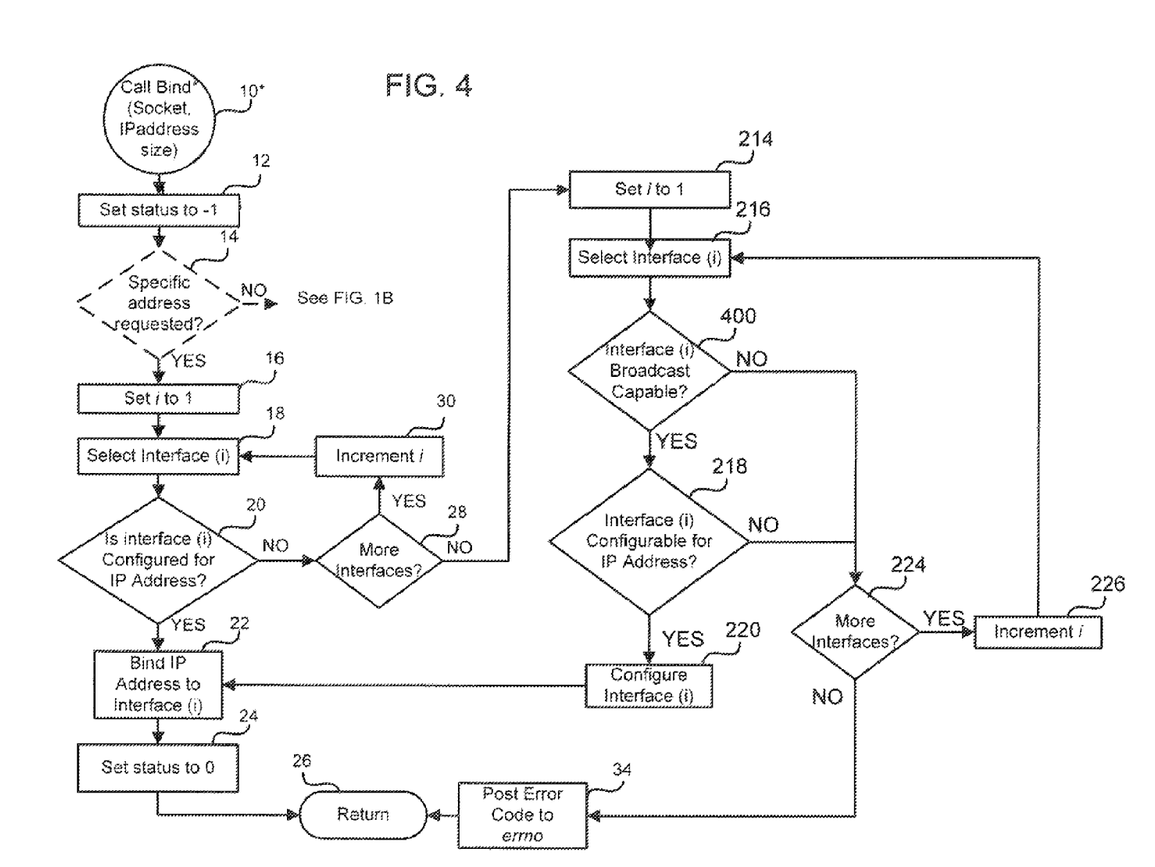
FIG. 4 is a process flow diagram illustrating an alternative to the embodiment illustrated in FIG. 2.

A third embodiment is illustrated in FIG. 4, which includes an additional test conducted on each interface as to whether it is capable of receiving broadcast or multicast data streams. In this embodiment, the bind*( ) function proceeds in a manner identical to that described above with reference to FIG. 2 with the exception of a new step 400. Accordingly, the description of FIG. 2 is incorporated by reference here for like steps to avoid the need for redundant description. When the bind*( ) function selects an interface for evaluation of its configurability for the indicator IP address, the function first tests the selected interface to determine whether it has the capability to receive a broadcast or multicast stream of IP data, step 400. This test may be accomplished by accessing the ACL to determine the interface parameters or by conducting a direct query of the interface. Evaluating the selected interface's capacity for receiving a broadcast or multicast stream of IP data before evaluating a particular interface for its configurability may be more efficient since this determination may be made quickly via the ACL while determining the configurability of an interface may take more time for processing power. If this evaluation confirms that the interface is capable of receiving a broadcast or multicast stream of IP data (i.e., the result of test 400 is "YES"), the bind*( ) function proceeds to test whether the selected interface is capable of being configured to the indicated IP address, step 218. However, if the selected interface is not capable of receiving a broadcast or multicast stream of IP data, the bind*( ) function proceeds to increment the loop to evaluate the next interface, such as by testing whether additional interfaces are available for evaluation, step 224, and if so, incrementing the counter, step 226. With the exception of evaluating an interface's capability to receive a broadcast or multicast stream of IP data, the rest of the functionality of the embodiment illustrated in FIG. 4 is identical to that of the embodiment illustrated in FIG. 2 and described above with reference to that figure.

Figure 5:
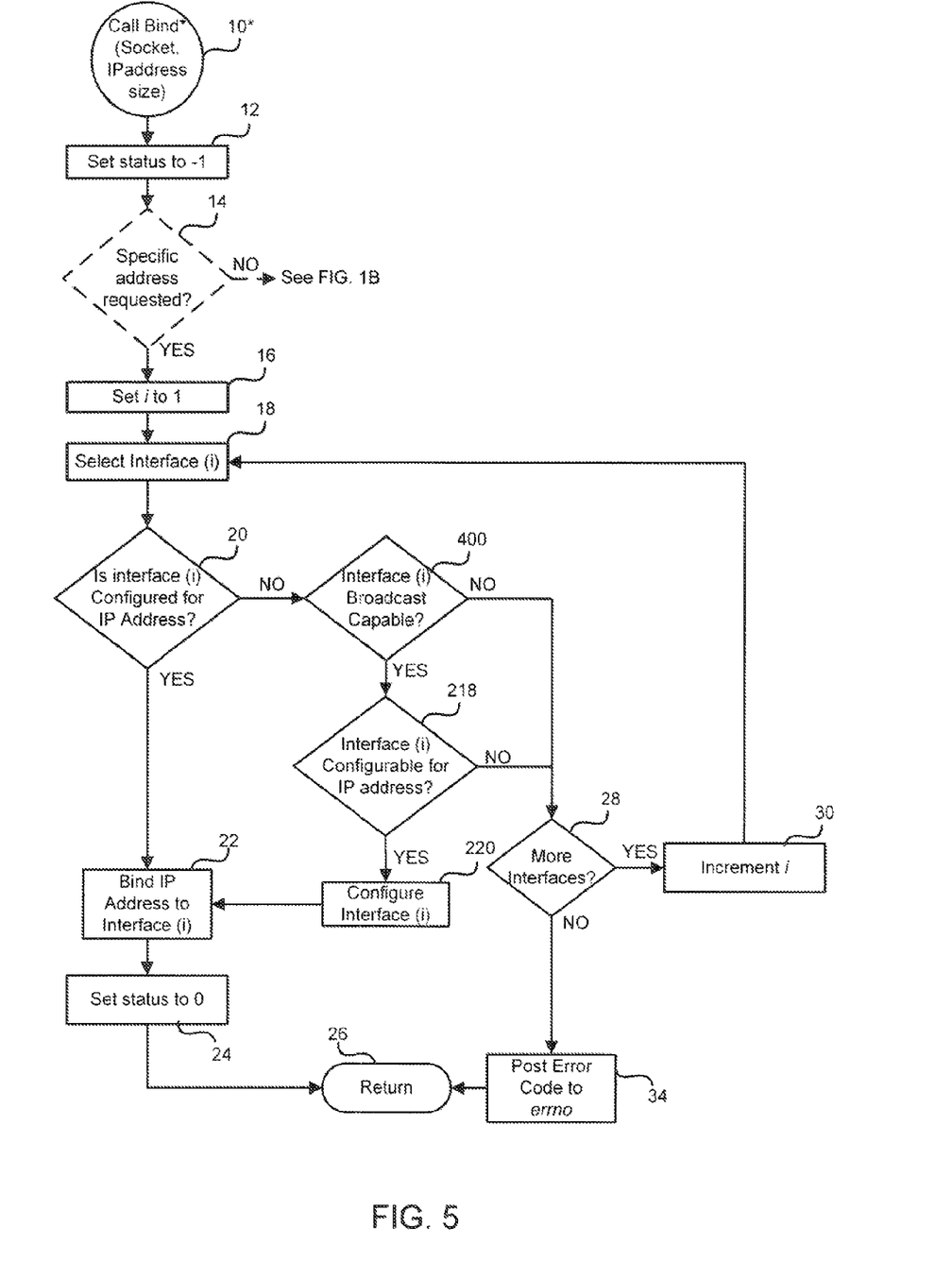
FIG. 5 is a process flow diagram illustrating an alternative to the embodiment illustrated in FIG. 3.

In a similar manner, FIG. 5 illustrates an alternative embodiment that is identical to the embodiment illustrated in FIG. 3 with the exception of an added test of the selected interface to determine whether it has the capability to receive a broadcast or multicast stream of IP data, step 400. The description of FIG. 3 is incorporated by reference here for like steps to avoid the need for redundant description. When the bind*( ) function has determined that an interface has not been configured for the indicated IP address, test 20, that interface is evaluated to determine if it is capable of receiving a broadcast data stream, 400. If it is, the selected interface is then evaluated to determine whether it could be configured for the indicated IP address, step 230. However, if the selected interface is not capable of receiving a broadcast or multicast stream of IP data, the loop is incremented, such as by testing whether additional interfaces are available for evaluation, step 28, and if so, incrementing the counter, step 30, before looping back to step the 18. With the exception of evaluating of an interface's capability to receive a broadcast or multicast stream of IP data, the rest of the functionality of the embodiment illustrated in FIG. 5 is identical to that of the embodiment illustrated in FIG. 3 and described above with reference to that figure.

Figure 6:
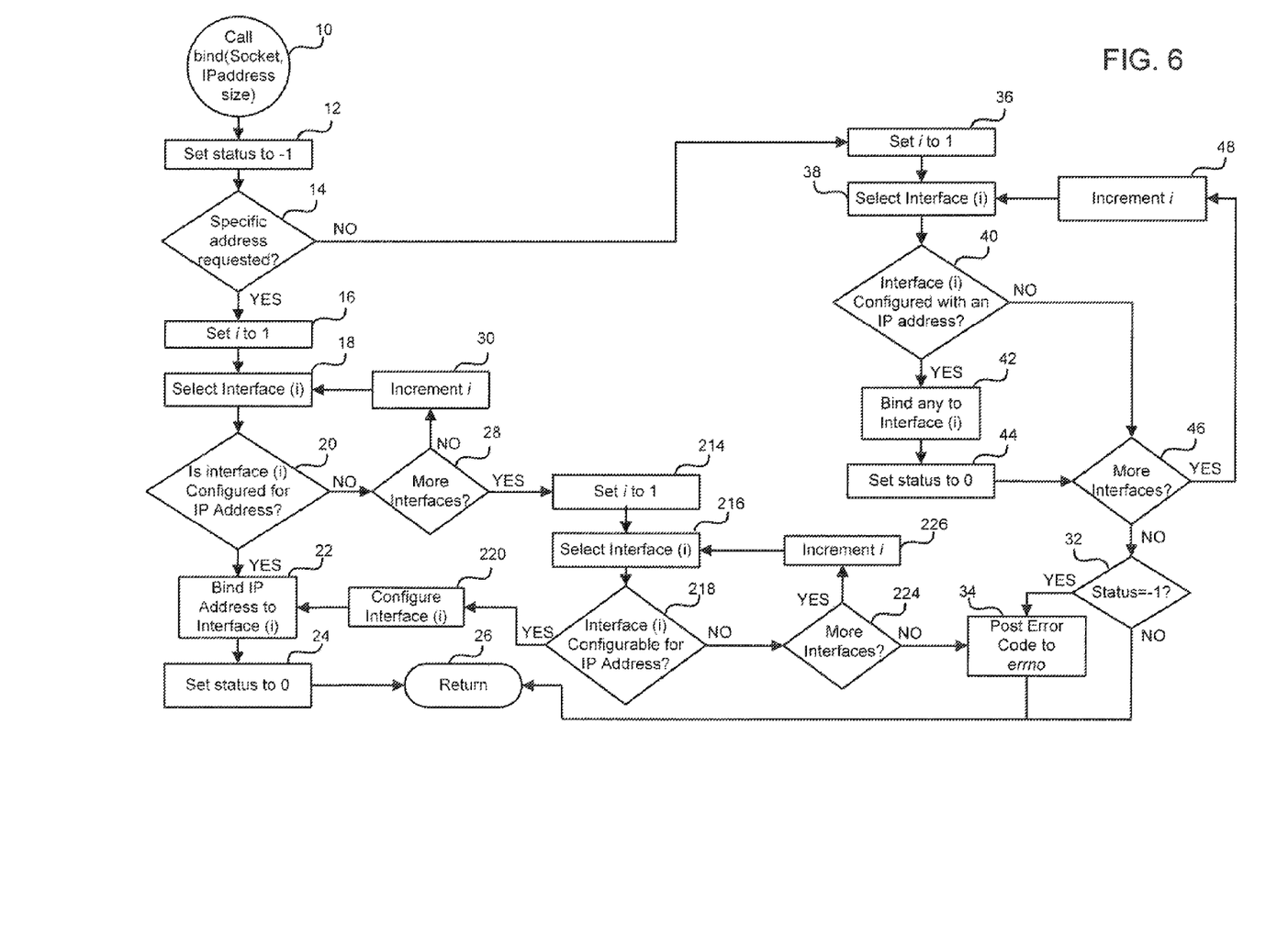
FIG. 6 is a process flow diagram illustrating the functionality of a modified bind( ) API implementing the embodiment illustrated in FIG. 2.

As mentioned above, the various embodiments may be implemented as a modified bind( ) API which retains all of the legacy functionality. FIG. 6 illustrates such an embodiment in which the additional functionality 200 described above with reference to FIG. 2 is incorporated into the full functionality of the bind*( ) API. In this embodiment, if an IP address is included in the bind*( ) call 10* arguments, the function proceeds as described above with reference to FIG. 2. If the bind*( ) call 10* arguments include an INADDR_ANY or "0" for the IP address, invoking the INADDR_ANY bind-any functionality, the result of test 14 is "NO" so the function then proceeds to perform the loop of steps 38, 40, 42, 44, 46, 48 to test each interface to determine whether the interface is configured with an IP address, test 40. Specifically, a counter may be initialized to indicate or point to the first interface, step 36. Then using the count value, the function selects an interface, step 38, and the selected interface is queried to determine if it has been configured for the any IP address, test 40. If the selected interface is configured for an IP address, that interface is bound, step 42, and a success status flag of "0" is set, step 44. Whether the selected interface is not configured for an IP address or it is successfully bound in step 42, the loop is incremented such as by testing whether additional interfaces remain to be evaluated, test 46, and if so, the counter is incremented, step 48, before the function loops back to step 38. However, if there are no more interfaces to be evaluated (i.e., the result of test 46 is "NO"), the bind*( ) function may test the status flag to determine if it is still equal to "−1" or that it has been set to "0" as the result of one of the interfaces being bound to any IP address, test 32. If the result of this test is "NO" (i.e., the status flag equals "0"), the function returns to the application that called the bind*( ) API, step 26, returning the "0" status value. However, if the status flag equals "−1" (i.e., the result of test 32 is "YES"), this indicates that the binding operation was not successful, so an error code is posted to an error register, step 34, before the function returns to the application which called the bind*( ) API, step 26. The remaining steps illustrated in FIG. 6 of the modified bind*( ) functionality are essentially the same as those described above with reference to FIG. 2.

Figure 7:
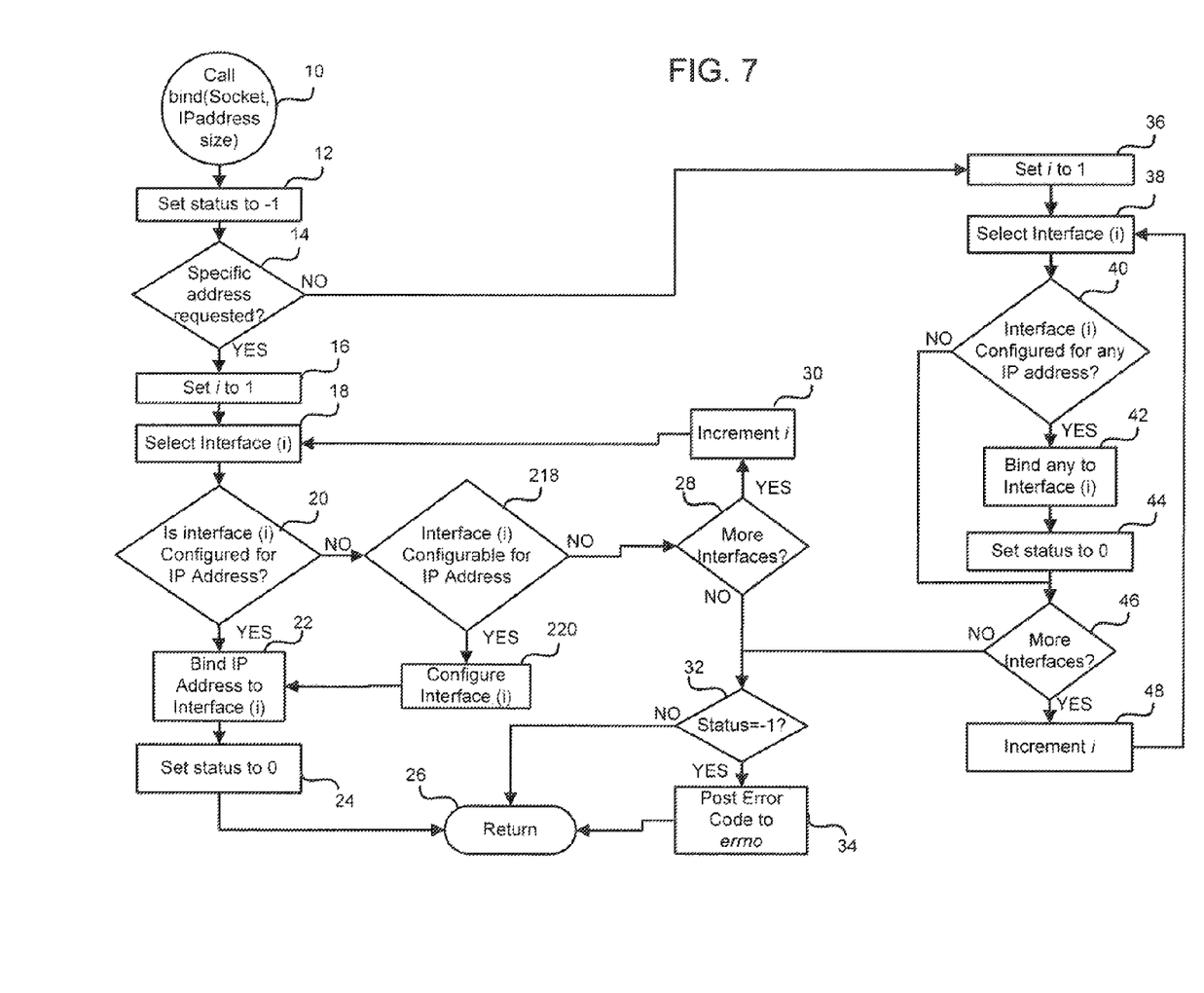
FIG. 7 is a process flow diagram illustrating the functionality of a modified bind( ) API implementing the embodiment illustrated in FIG. 3.

In a similar manner, FIG. 7 illustrates an embodiment in which the added functionality 300 described above with reference to FIG. 3 is incorporated into the full functionality of the bind*( ) API. In this embodiment, if an IP address is included in the bind*( ) call 10* arguments, the function proceeds as described above with reference to FIG. 2. If the bind*( ) call 10* arguments include an INADDR_ANY or "0" for of the IP address, invoking the INADDR_ANY bind-any functionality, which is essentially the same as that described for steps 36-48 above in FIG. 6. The remaining steps illustrated in FIG. 7 of the modified bind*( ) functionality are essentially the same as those described above with reference to FIG. 3.

Figure 8:
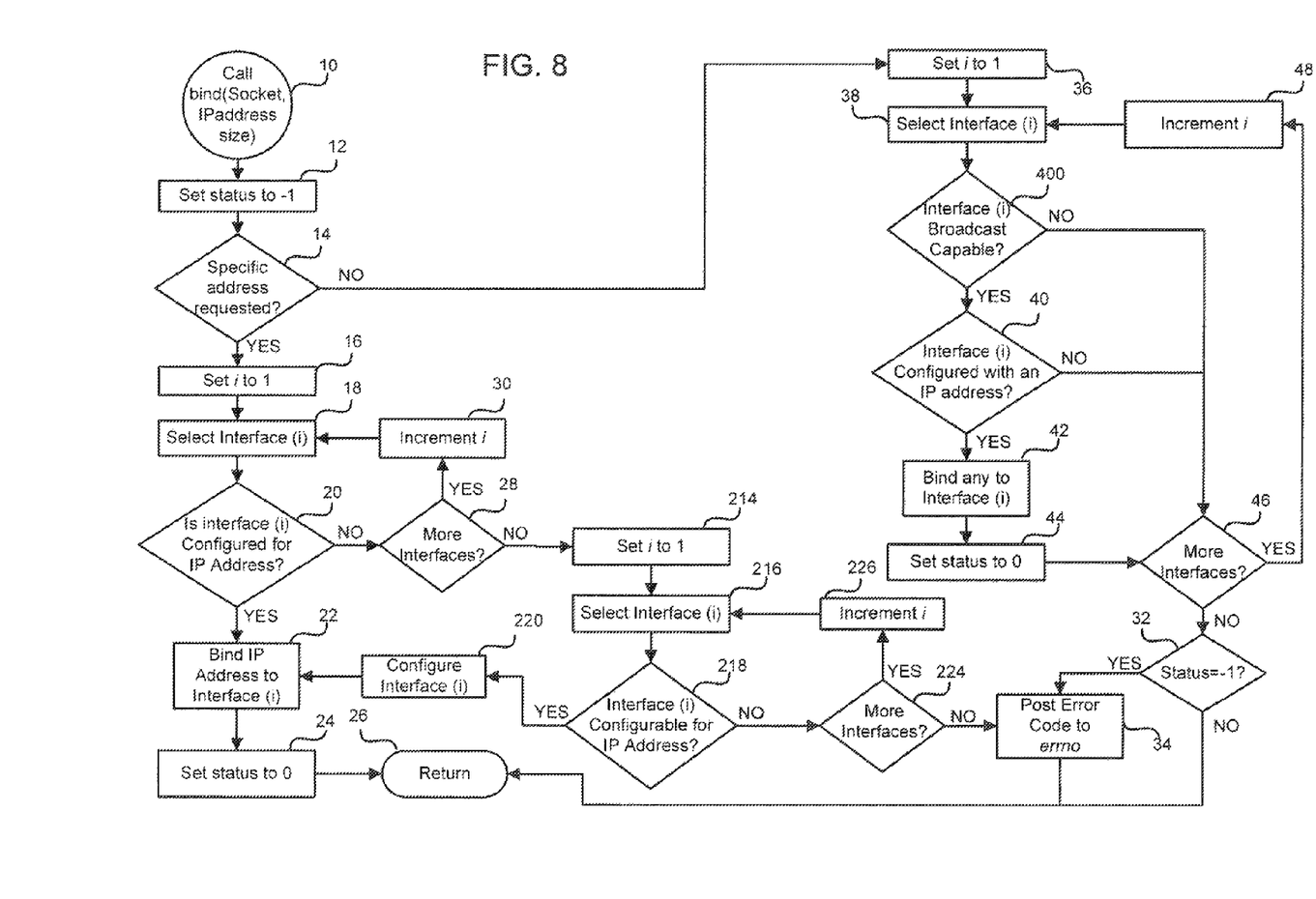
FIG. 8 is a process flow diagram illustrating the functionality of a modified bind( ) API implementing the embodiment illustrated in FIG. 4.

In a similar manner, FIG. 8 illustrates an embodiment in which the added functionality 200 described above with reference to FIG. 2 and the additional test 400 of a selected interface described above with reference to FIG. 4 is incorporated into the full functionality of the bind( ) API. In this embodiment, if an IP address is included in the bind*( ) call 10* arguments, the function proceeds as described above with reference to FIG. 2. If the bind*( ) call 10* arguments include an INADDR_ANY or "0" for the IP address, invoking the INADDR_ANY bind-any functionality, which is essentially the same as that described for steps 36-48 above in FIG. 6. The remaining steps illustrated in FIG. 8 of the modified bind functionality are essentially the same as those described above with reference to FIG. 4.

Figure 9:
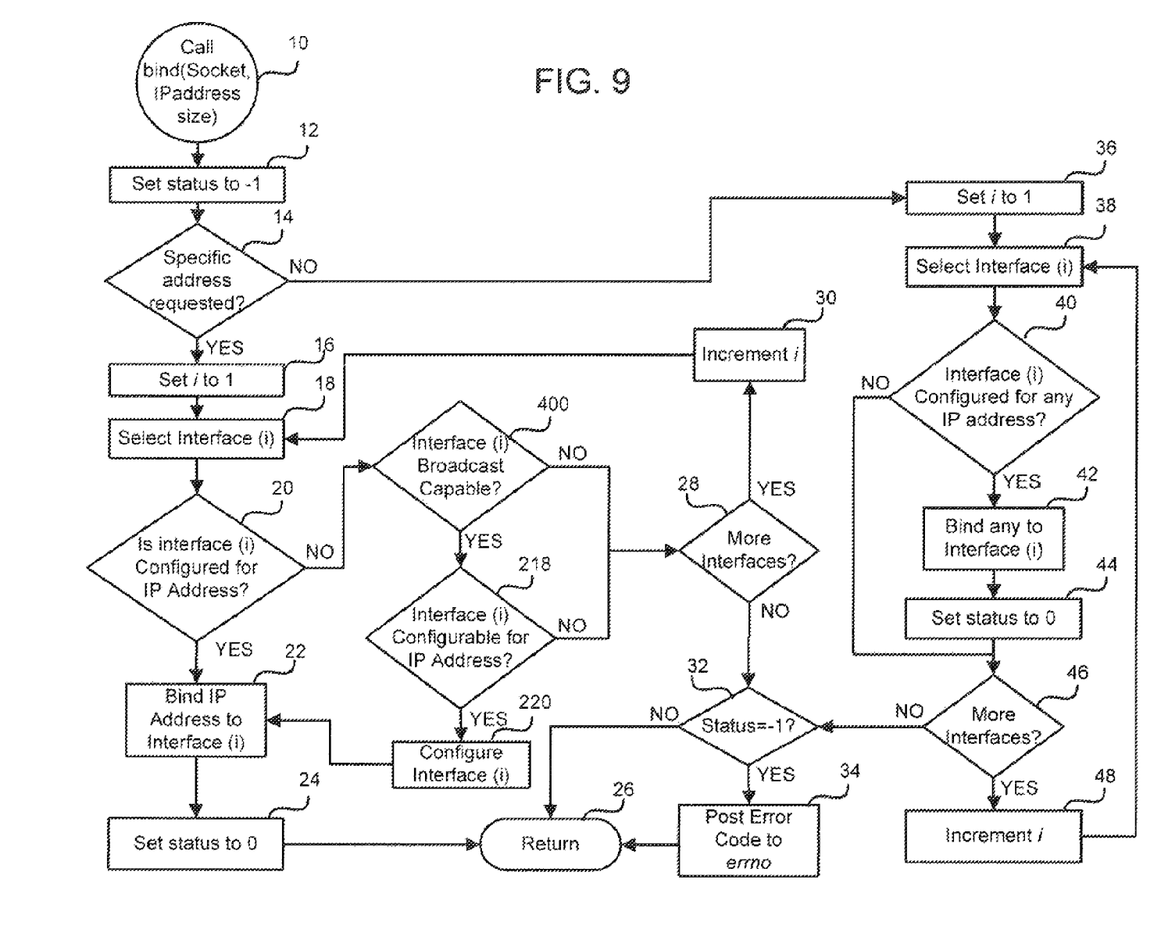
FIG. 9 is a process flow diagram illustrating the functionality of a modified bind( ) API implementing the embodiment illustrated in FIG. 5.

Similarly, FIG. 9 illustrates an embodiment in which the added functionality 300 described above with reference to FIG. 3 and the additional test 400 of a selected interface described above with reference to FIG. 5 is incorporated into the full functionality of the bind*( ) API. In this embodiment, if an IP address is included in the bind*( ) call 10* arguments, the function proceeds as described above with reference to FIG. 3. If the bind*( ) call arguments include an INADDR_ANY or "0" for the IP address, invoking the INADDR_ANY bind-any functionality, which is essentially the same as that described for steps 36-48 above in FIG. 6. The remaining steps illustrated in FIG. 9 of the modified bind functionality are essentially the same as those described above with reference to FIG. 5.

In a further embodiment most applicable to the embodiments illustrated in FIGS. 2, 4, 6 and 8, the interfaces can be queried in order of a priority, such as may be established based upon policy rules. To accomplish this, a priority order listing of the interfaces may be created for use in evaluating the interfaces and in order through the loop comprising the steps 214, 216, 218, 224, 226. By preparing such a listing in order of priority, so that the first interface has the highest priority and the last interface has the lowest priority according to policy rules, the process described above for evaluating the configurability of interfaces will ensure that the interface that is configured and bound will be the highest priority according to the policy rules. In order to create this priority list, a set of policy parameters, rules or prioritization criteria need to be known to an interface ranking application such as a policy based routing engine. Such policy parameters may include cost, quality of service, standard protocol preferences, and other factors related to individual interfaces. The interface ranking application then can access information stored in the ACL for each interface, and apply the policy parameters, rules or prioritization criteria in order to develop a ranking value or criteria. Once this evaluation of interface characteristics obtained from the ACL against policy parameters, rules or prioritization criteria has been completed for all interfaces, the interfaces can be arranged in order of the ranking value or criteria. To implement this embodiment, the modified bind*( ) API needs to use the rank order listing in order to do the loop through the interfaces in new functionality 200 that is described above with reference to FIG. 2.

In a further alternative embodiment, policy based rules may be applied to interface characteristics, such as can be obtained from the API, at the time that an interface is selected for evaluation, step 216 in FIGS. 2, 4, 6, and 8. Similarly, additional policy based rules tests may be conducted prior to testing a selected interface to determine if it is capable of being configured for the indicated IP address. For example, the embodiments described above with reference to FIGS. 4, 5, 8 and 9 implement a type of policy based test by evaluating whether an interface is capable of receiving a broadcast or multicast IP stream of IP data prior to testing the configurability of the selected interface. As described above, if this policy based test is not satisfied, then the interface is not evaluated for configurability. This concept can be further applied to other policy parameters, such as cost, quality of service, security, and SP preference.

Figure 10:
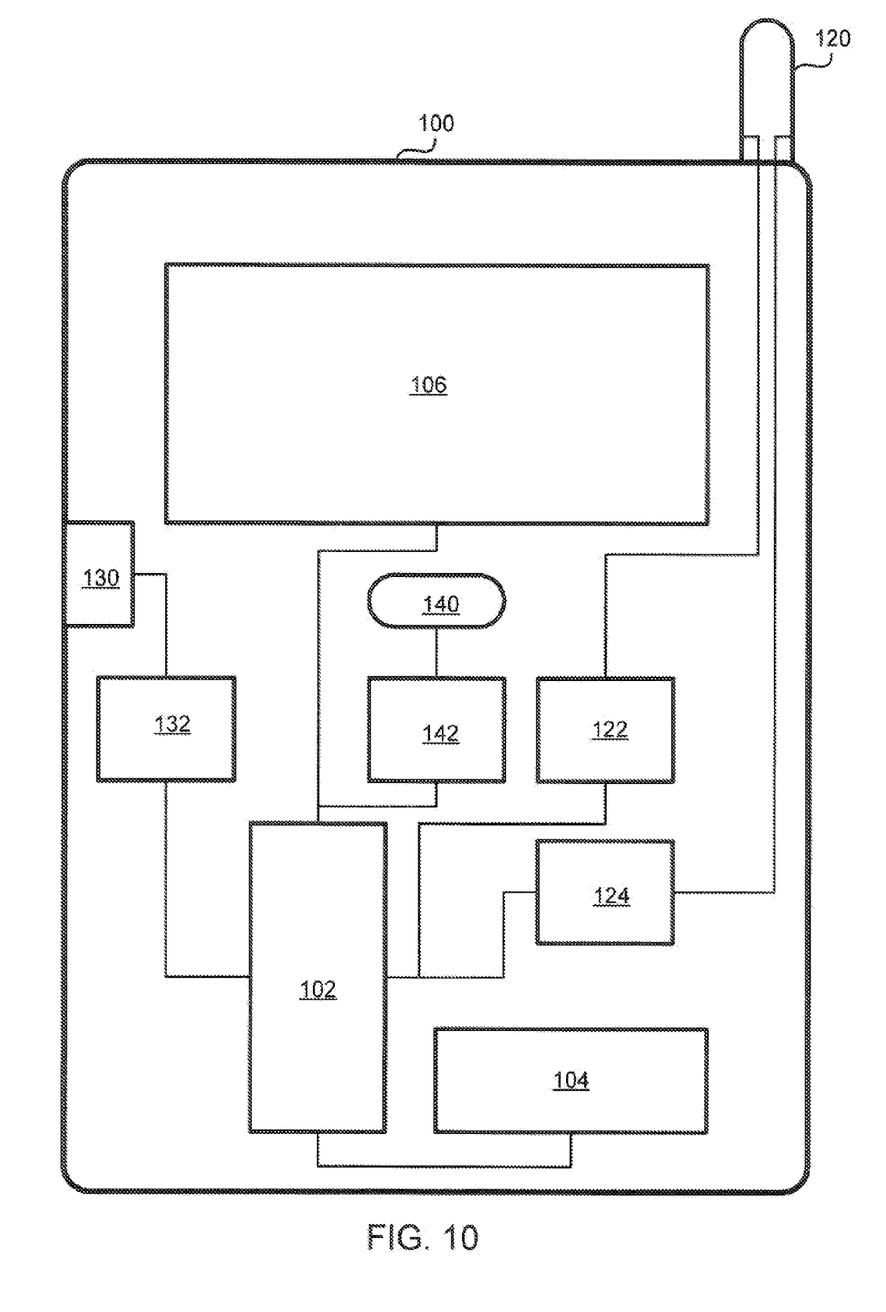
FIG. 10 is a mobile device for use with the above embodiments.

The various embodiments described above may be implemented in a mobile device configured with circuitry and software for receiving an Internet broadcast or multicast Internet data stream via a cellular telephone or wireless network connection. An example embodiment of such a mobile device 100 is illustrated in FIG. 10, which may be any of a cellular telephone, multimedia Internet enabled cellular telephone, personal digital assistant, and/or wireless electronic mail receiver. Such a mobile device 100 may include a processor 102 coupled to memory 104 and a display 106. The mobile device 100 may also include a number of data input/output interfaces, such as for example, a cellular telephone data receiver, a wired (e.g., FireWire) data link, a Bluetooth wireless data link, and infrared data link. A cellular telephone data receiver may include an antenna 120 for receiving the electromagnetic signals from a wireless network transmitter/receiver (not shown), and a wireless transceiver 122 connected to the antenna 120 for receiving the wireless signal and converting the signals into digital data that is relayed to the processor 102. Similarly, a Bluetooth or similar local wireless data link may include the antenna 120 (or another antenna not shown separately) connected to a Bluetooth transceiver 124 which converts the received wireless signal into digital data that is relayed to the processor 102. Data may also be transmitted to and from the mobile device 100 by means of a wired data link, such as a FireWire, USB, serial (e.g., RS-232), or Ethernet data link. For example, data may be transmitted by way of a FireWire data connector 130 coupled to a FireWire modem circuit 132 which converts data received from the connector 130 into digital data that is relayed to the processor 102. As is well known in the art, other wired data links would involve similar circuitry as suitable to the particular data link. Data may also be transmitted to and from the mobile device 100 by means of an infrared (IR) data link, such as by way of an IR data transmitter/receiver 140 coupled to an IR data link modem circuit 142 which converts data received from the IR transmitter/receiver 140 into digital data that is relayed to the processor 102.

Each of the cellular telephone data receiver 120, 122, wired data link 130, 132, Bluetooth wireless data link 120, 124, and the IR data link 140, 142 are interfaces that the processor may access to receive data. Additionally, other interfaces may be implemented within the mobile device 100 for transferring data between other modules and co-processors. Thus, in order to receive a broadcast or multicast stream of IP data, the mobile device 100 must bind one of these interfaces to the IP address of the broadcast or multicast data stream. This may be accomplished by the processor 102 executing one of the embodiment methods described above, such as by executing software instructions configured to implement one of the methods. Such software instructions may be stored in memory 104 as an API or as compiled software implementing an embodiment method.

The processor 102 may be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

To implement the modified bind*( ) API of the various embodiments, the underlying software providing the bind( ) API functionality needs to be modified to add software similar to that described herein or software providing similar functionality. Additionally, the API will need to be updated so that application developers are informed of the new functionality and behavior of the modified bind( ) API.

The various embodiments illustrated in FIGS. 2-9 and described above have the advantage that in the event no interface has already been configured for the desired IP address, the bind*( ) API will take care of selecting a suitable interface, configuring it and then binding to the desired IP address all in one API call. As such, additional application complexity is not required to configure a particular interface for the IP. Further, since the interface selection configuration and binding is accomplished in a single API call, the bind*( ) API can be invoked by lower level software. This allows the new or modified bind*( ) API to be used to trigger the configuration and demodulation of an Internet broadcast or multicast stream at lower layers (i.e., software layers beneath the application layer) by passing the information that the lower layers need to identify the data stream input and demodulate it. This also allows lower layer software to configure the interface for receiving the IP data stream. Thus, the new or modified bind*( ) API eliminates the need for additional API calls to select, identify, configure and bind an interface to an IP address, simplifying the application developer's task.

The various embodiments are particularly advantageous in the context of applications for receiving broadcast or multicast IP content. This is because in such circumstances it is not anticipated that there will be communication in the reverse direction as is the case in other types of Internet applications. Therefore, the complexity associated with joining an IP address, which necessarily requires joining and leave the operations, can be avoided by implementing the modified bind*( ) API of the various embodiments.

The hardware used to implement the events of forgoing embodiments may be processing elements and memory elements configured to execute a set of instructions, wherein the set of instructions are for performing method steps corresponding to the above events. Alternatively, some events may be performed by circuitry that is specific to a given function.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method implemented on a mobile device for binding one of a plurality of local interfaces of the mobile device to a specific IP address for reception of data via the Internet, comprising:

determining whether one of the plurality of local interfaces of the mobile device is configured for the specific IP address;

binding the one of the plurality of local interfaces to the specific IP address when it is determined that the one of the plurality of local interfaces is configured for the specific IP address;

repeating the steps of determining whether one of the plurality of local interfaces is configured for the specific IP address until at least one of the plurality of interfaces is bound to the specific IP address or all of the plurality of local interfaces of the mobile device have been evaluated;

selecting one of the plurality of local interfaces when none of the plurality of local interfaces of the mobile device has been bound to the specific IP address;

determining whether the selected one of the plurality of local interfaces can be configured for the specific IP address;

configuring the selected one of the plurality of local interfaces for the specific IP address when it is determined that the selected one of the plurality of local interfaces can be configured for the specific IP address;

binding the selected one of the plurality of local interfaces to the specific IP address when it is determined that the selected one of the plurality of local interfaces can be configured for the specific IP address;

repeating the steps of selecting one of the plurality of local interfaces and determining when the selected one of the plurality of local interfaces can be configured for the specific IP address until at least one of the plurality of local interfaces of the mobile device is bound to the specific IP address or all local interfaces of the mobile device have been evaluated; and indicating a failure to bind when none of the plurality of local interfaces of the mobile device is bound to the specific IP address.

2. The method of claim 1, further comprising determining whether the selected one of the plurality of local interfaces is capable of receiving a broadcast or multicast stream of Internet data, wherein determining whether the selected one of the plurality of local interfaces can be configured for the specific IP address is accomplished only when the selected one of the plurality of local interfaces is determined to be capable of receiving a broadcast or multicast stream of Internet data.

3. The method of claim 1, wherein the step of selecting one of the plurality of local interfaces comprises selecting from the plurality of local interfaces according to a prioritized order.

4. The method of claim 1, wherein the step of selecting one of the plurality of local interfaces comprises selecting from the plurality of local interfaces according to a prioritized order based upon policy rules applied to characteristics of each one of the plurality of local interfaces.

5. A non-transitory processor readable storage medium having stored thereon processor executable instructions configured to cause a processor in a mobile device to perform operations for binding one of a plurality of local interfaces of the mobile device to a specific IP address for reception of data via the Internet, the operations comprising:

determining whether one of the plurality of local interfaces of the mobile device is configured for the specific IP address;

binding the one of the plurality of local interface to the specific IP address when it is determined that the one of the plurality of local interfaces is configured for the specific IP address;

repeating the steps of determining when one of the plurality of local interfaces is configured for the specific IP address until at least one of the plurality of local interfaces of the mobile device is bound to the specific IP address or each of the plurality of local interfaces of the mobile device have been evaluated;

selecting one of the plurality of local interfaces of the mobile device when none of the plurality of local interfaces of the mobile device has been bound to the specific IP address;

determining whether the selected one of the plurality of local interfaces can be configured for the specific IP address;

configuring the selected one of the plurality of local interfaces for the specific IP address when it is determined that the selected one of the plurality of local interfaces can be configured for the specific IP address;

binding the selected one of the plurality of local interfaces to the specific IP address when it is configured for the specific IP address;

repeating the steps of selecting one of the plurality of local interfaces and determining when the selected one of the plurality of local interfaces can be configured for the specific IP address until at least one of the plurality of local interfaces of the mobile device is bound to the specific IP address or each of the plurality of local interfaces of the mobile device has been evaluated; and indicating a failure to bind when none of the plurality of local interfaces of the mobile device is bound to the specific IP address.

6. The non-transitory processor readable storage medium of claim 5, wherein the stored processor executable instructions are configured to cause a processor in a mobile device to perform operations further comprising evaluating whether the selected one of the plurality of local interfaces is capable of receiving a broadcast or multicast stream of Internet data, and wherein evaluating whether the selected one of the plurality of local interfaces can be configured for the specific IP address is accomplished only when the selected one of the plurality of local interfaces is evaluated to be capable of receiving a broadcast or multicast stream of Internet data.

7. The non-transitory processor readable storage medium of claim 5, wherein the stored processor executable instructions are configured to cause a processor in a mobile device to perform operations such that selecting one of the plurality of local interfaces comprises selecting from the plurality of local interfaces according to a prioritized order.

8. The non-transitory processor readable storage medium of claim 5, wherein the stored processor executable instructions are configured to cause a processor in a mobile device to perform operations such that selecting one of the plurality of local interfaces comprises selecting from the plurality of local interfaces according to a prioritized order based upon policy rules applied to characteristics of each of the plurality of local interfaces.

9. A mobile device, comprising:
   a processor;
   a plurality of local interfaces; and a memory coupled to the processor, the memory having stored therein software instructions configured to cause the processor to perform the steps of:

determining whether one of the plurality of local interfaces is configured for a specific IP address;

binding the one of the plurality of local interface to the specific IP address when the one of the plurality of local interfaces is configured for the specific IP address;

repeating the steps of determining when one of the plurality of local interfaces is configured for the specific IP address until at least one of the plurality of local interface is bound to the specific IP address or each of the plurality of local interfaces has been evaluated;

selecting one of the plurality of local interfaces when none of the plurality of local interfaces has been bound to the specific IP address;

determining whether the selected one of the plurality of local interfaces can be configured for the specific IP address;

configuring the selected one of the plurality of local interfaces for the specific IP address when it is determined that the selected one of the plurality of local interfaces can be configured for the specific IP address;

binding the selected one of the plurality of local interfaces to the specific IP address when the selected one of the plurality of local interfaces is configured for the specific IP address;

repeating the steps of selecting one of the plurality of local interfaces and determining when the selected one of the plurality of local interfaces can be configured for the specific IP address until at least one selected one of the plurality of local interfaces interface is bound to the specific IP address or each selected one of the plurality of local interfaces has been evaluated; and indicating a failure to bind when none of the plurality of local interfaces is bound to the specific IP address.

10. The mobile device of claim 9, wherein the software instructions are further configured to cause the processor to perform the step of determining whether the selected one of the plurality of local interfaces is capable of receiving a broadcast or multicast stream of Internet data, wherein the software instructions are further configured so the step of determining whether the selected one of the plurality of local interfaces can be configured for the specific IP address is accomplished only when the selected one of the plurality of local interfaces is determined to be capable of receiving a broadcast or multicast stream of Internet data.

11. The mobile device of claim 9, wherein the software instructions are further configured to cause the processor to select one of the plurality of local interfaces according to a prioritized order.

12. The mobile device of claim 9, wherein the software instructions further configured to cause the processor to select one of the plurality of local interfaces according to a prioritized order based upon policy rules applied to characteristics of each selected one of the plurality of local interfaces.

* * * * *